(12) United States Patent
Werner

(10) Patent No.: US 8,696,475 B2
(45) Date of Patent: Apr. 15, 2014

(54) DURABLE TORSIONAL VIBRATION DAMPER

(71) Applicant: Schaeffler Technologies AG & Co. KG, Herzogenaurach (DE)

(72) Inventor: Markus Werner, Buehl (DE)

(73) Assignee: Schaffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/690,554

(22) Filed: Nov. 30, 2012

(65) Prior Publication Data

US 2013/0150168 A1 Jun. 13, 2013

(30) Foreign Application Priority Data

Dec. 7, 2011 (DE) .................. 10 2011 087 865

(51) Int. Cl.
*F16F 15/123* (2006.01)
(52) U.S. Cl.
USPC .......................................................... 464/67.1

(58) Field of Classification Search
USPC .............. 464/7, 67.1, 68.3, 68.6; 192/113.5
See application file for complete search history.

(56) References Cited

U.S. PATENT DOCUMENTS

| 5,209,330 A * | 5/1993 | Macdonald | 464/67.1 X |
| 5,224,576 A * | 7/1993 | Fujimoto | 464/67.1 X |
| 2011/0263340 A1 * | 10/2011 | Degler | |

* cited by examiner

*Primary Examiner* — Gregory Binda
(74) *Attorney, Agent, or Firm* — Simpson & Simpson, PLLC

(57) ABSTRACT

A torsional vibration damper for operation in an oil bath comprising an input flange for connecting to a drive motor, an output flange for connecting to a transmission, and a bow spring for the torsionally elastic coupling of the input flange to the output flange, where the bow spring is in contact radially on the outside with an encircling holding device that is formed on one of the flanges. At the same time, the holding device has an opening in the area of the bow spring, in order to enable a flow of oil through an area of contact of the bow spring with the holding device.

7 Claims, 4 Drawing Sheets

DURABLE TORSIONAL VIBRATION DAMPER

CROSS-REFERENCE TO RELATED APPLICATIONS

This application claims priority from German Patent Application No. 10 2011 087 865.3, filed on Dec. 7, 2011, which application is incorporated herein by reference.

FIELD OF THE INVENTION

The invention relates generally to torsional vibration dampers, more specifically to torsional vibration dampers operating in an oil bath, and, even more specifically, to torsional vibration dampers operating in an oil bath in a drivetrain of a motor vehicle.

BACKGROUND OF THE INVENTION

A known serial torsional vibration damper comprises an input flange, an intermediate flange and an output flange, wherein a bow spring positioned radially outside is provided for the elastic transmission of torque from the input flange to the intermediate flange, and a compression spring positioned radially inside is provided for the elastic transmission of torque from the intermediate flange to the output flange. The input flange is usually shaped so that it receives the bow spring in a cup-like manner and supports it in a radially outer area, so that the bow spring is in contact with the input flange under the influence of centrifugal force. Such a flange is known as a retainer.

In particular, when used on a multi-cylinder reciprocating internal combustion engine, the torsional vibrations initiated by the internal combustion engine can result in deflections of the intermediate flange relative to the input flange with small angles of attack at a high frequency. In the contact area between the flange and the bow spring there develops a rubbing of steel on steel, which causes an abrasion of at least one of the frictional partners. The abrasion particles can be very fine, and can collect between the spring coils of the bow spring. That causes the abrasion particles to be further tumbled during the continuing operation of the torsional vibration damper and to be ground between the retainer and the bow spring, which further accelerates the wearing of both frictional partners.

SUMMARY OF THE INVENTION

The present invention broadly comprises a torsional vibration damper for operation in an oil bath, where the torsional vibration damper comprises the following: an input flange for connecting to a drive motor; an output flange for connecting to a transmission; a bow spring for the rotationally elastic connection of the input flange to the output flange; wherein the bow spring can be in contact radially on the outside with an encircling holding device that is formed on one of the flanges, characterized in that the holding device includes an opening in the area of the bow spring, in order to enable a flow of oil through an area of contact of the bow spring with the holding device.

A torsional vibration damper according to the invention, for operation in an oil bath, comprises an input flange for connecting to a drive motor, an output flange for connecting to a transmission, and a bow spring for the torsionally elastic coupling of the input flange to the output flange, where the bow spring may be in contact radially on the outside with an encircling holding device that is formed on one of the flanges. In this case, the holding device has an opening in the area of the bow spring, in order to enable a flow of oil through an area of contact of the bow spring with the holding device. At the same time, in certain operating conditions the bow spring may be in contact with the holding device, for example when a defined speed of rotation is exceeded.

An abrasion which occurs due to wear caused by friction of the bow spring on the holding element can thus be flushed away by the oil, so that the abrasion particles are removed from the area of contact of the bow spring with the holding device, minimizing wear. The abrasion particles can be kept back from the oil, for example, by means of a conventional filter in an oil circuit. The service life of the torsional vibration damper, and in particular of the bow springs, can be prolonged by the oil flushing, without requiring expensive measures such as browning or nitrifying to increase the robustness of the bow springs and/or of the holding device.

In a preferred embodiment, the opening is situated in the area of a radial vertex of the holding device. Oil that is pressed out by centrifugal force in the area of the holding device, can thereby be removed in an improved manner from the holding device, so that the flow of oil can pass very close to the area of contact, or even through the area of contact.

The opening may also lie outside of the area of contact. Wear on the bow spring, which can be caused by a section of the spring sweeping over the opening, is thereby prevented.

Preferably, the opening is offset axially outward from the radial vertex of the holding device. The area of contact can thereby include the vertex, and thus provide for good radial bracing of the bow spring, while at the same time the opening is not swept over directly by sections of the bow spring. Additional wear due to sweeping over the boundaries of the cutout can thereby be prevented.

In one embodiment, the holding device is formed in a flat material of the flange, and the opening is formed by a lift flap in the flat material. The lift flap can be easy to produce, and in particular subsequent to a known fabrication of the flange with the holding device, for example from a piece of sheet metal.

In a preferred embodiment, the lift flap is formed in a radial connecting section of the flange and is opened radially toward the inside, in order to let oil pass through that is flowing radially outward at the surface of the connecting section. This enables the flow of oil to be initiated in the area of contact without requiring an active supply of fresh oil, for example by means of a device for spraying the flange with oil.

The object of the invention is to specify a torsional vibration damper that has an extended service life.

The object is fulfilled by a torsional vibration damper having the features of the independent claim. Subordinate claims describe preferred embodiments.

These and other objects and advantages of the present invention will be readily appreciable from the following description of preferred embodiments of the invention and from the accompanying drawings and claims.

BRIEF DESCRIPTION OF THE DRAWINGS

The invention will now be described in greater detail by reference to the accompanying figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspect. The present invention is intended to include various modifications and equivalent arrangements within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
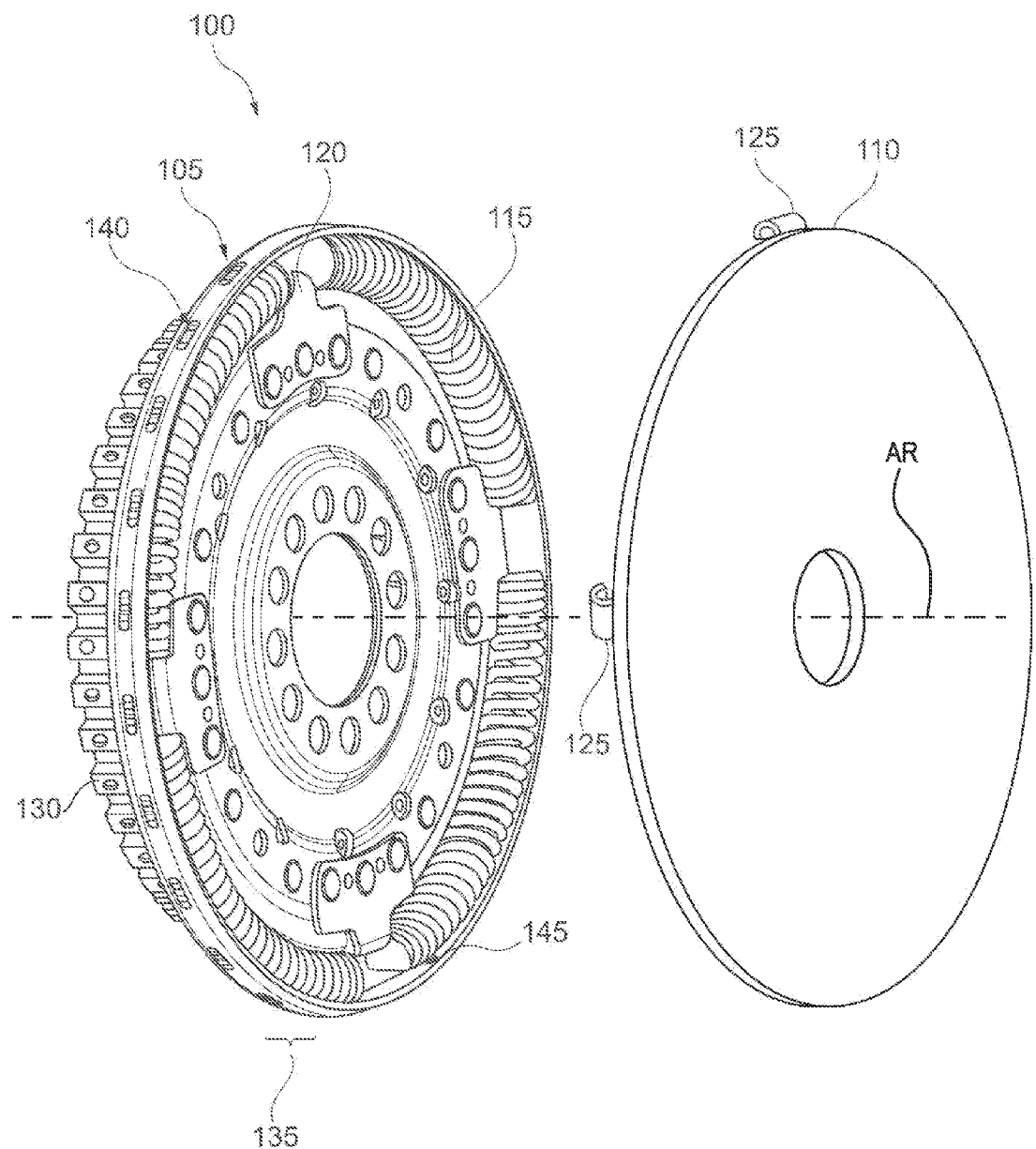
FIG. 1 shows a torsional vibration damper with a bow spring.

Adverting now to the Figures, FIG. 1 shows torsional vibration damper 100 for operating in an oil bath ("wet-running"), preferably in a drivetrain of a motor vehicle.

Torsional vibration damper 100 comprises input flange 105, output flange 110 positioned coaxially thereto (shown only schematically), and a number of bow springs 115 that are situated on a circumference around the axis of rotation of flanges 105 and 110. Here, each bow spring 115 is realized as a coaxial system of two bow springs.

Each bow spring 115 is in contact in an axial direction with two first contact elements 120, which are rigidly connected to input flange 105. In a corresponding manner, the ends of each bow spring 115 are also in contact with second contact elements 125, which are rigidly connected to output flange 110. Here, contact elements 120 and 125 are shaped so that a collision-free rotation of input flange 105 relative to output flange 110 is possible. During the rotation, no matter which direction, all of bow springs 115 are compressed.

Output flange 119 may also be an intermediate flange, which acts on an actual output flange through an arrangement of compression springs or some other vibration-damping transmission device. In this case, the depicted torsional vibration damper 100 is part of a serial torsional vibration damper. Other embodiments based on the depicted torsional vibration damper are likewise possible, for example having springs connected in parallel and/or using a centrifugal force pendulum or a dual mass flywheel.

In the depiction in FIG. 1, input flange 105 is connected to internal clutch basket 130. Through internal clutch basket 130, a torque can be introduced into torsional vibration damper 100, which is conveyed elastically to output flange 110 while absorbing torsional vibrations. In other embodiments, torque can also be introduced into input flange 105 in a different way, for example by means of a hub, a sprocket or gearing. Output flange 110 is usually set up for passing the conveyed torque to a transmission, for example by means of a hub having gear teeth.

Input flange 105 is designed as a so-called retainer; that is, it is formed essentially like a flat pot or a bowl, in order to surround bow springs 115 on one radial outer side. The section of input flange 105 which leads past bow springs 115 radially on the outside is therefore designated hereinafter as holding device 135. In an embodiment, holding device 135 can also be formed on output flange 110.

On one radial outer side of holding device 135, where input flange 105 extends farthest from the axis of rotation, a number of openings 140 are made in holding device 135. Openings 140 are distributed evenly around a circumference and have an elongated shape which extends in the circumferential direction, with rounded edges. Oil that is present in area of contact 145 of bow spring 115 with holding device 135 can absorb abrasion particles that occur due to rubbing of bow spring 115 on holding device 135. The abrasion particles may be present in the form of a fine metallic dust. As a result of centrifugal forces, the oil is pressed farther radially outward, and leaves torsional vibration damper 100 through one of openings 140. The oil in the area of torsional vibration damper 100 can be circulated by means of an external circulating pump, the oil being pressed through a filter that removes the abrasion particles from the oil.

Figure 2:
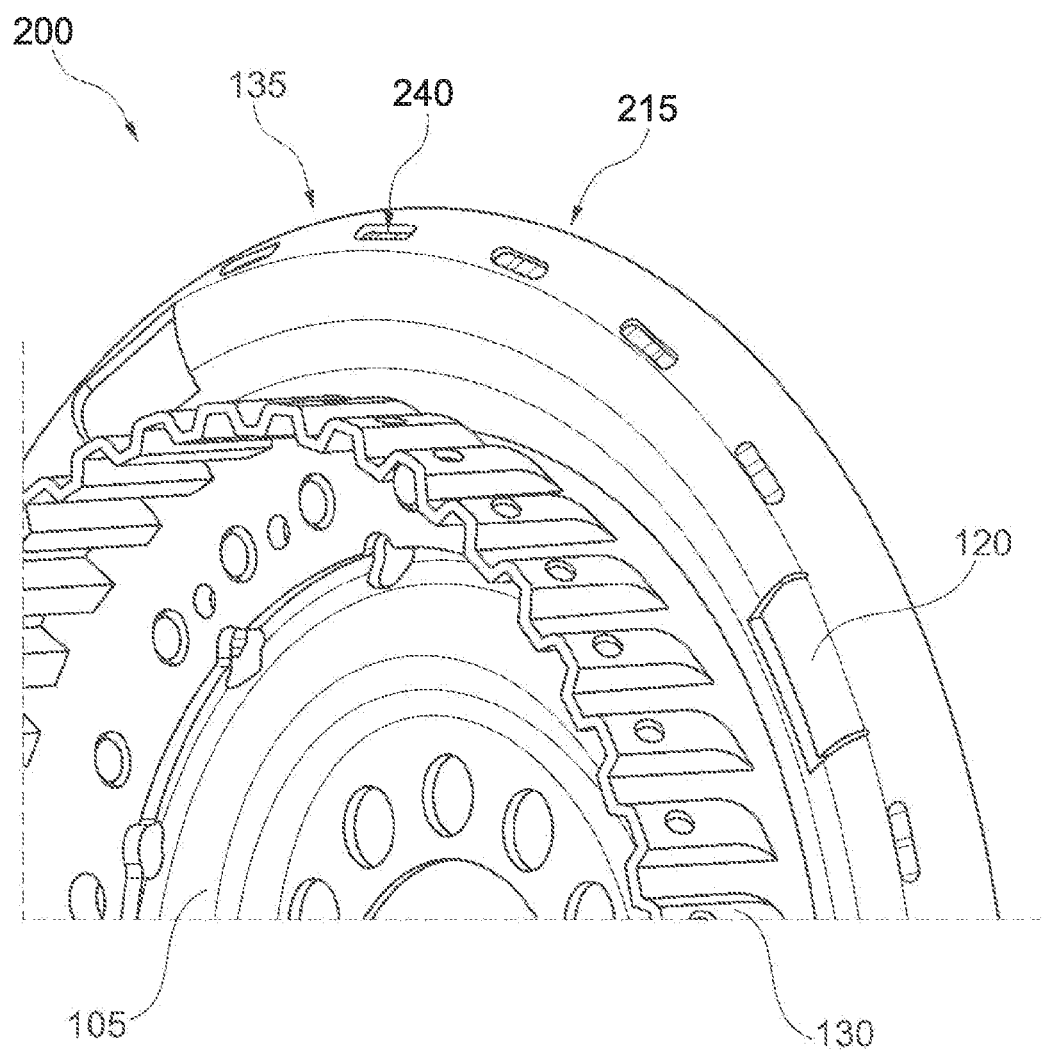
FIG. 2 shows another embodiment of the torsional vibration damper of FIG. 1.

FIG. 2 shows an embodiment of torsional vibration damper 200. Openings 240 are again arranged along a circumference around the axis of rotation of torsional vibration damper 200; in contrast to the embodiment depicted in FIG. 1, however, openings 240 are not made in input flange 105 at the outermost circumference, but radially farther inward, which simultaneously means an axial shift on the surface of the bulging holding device 135. The shift occurs in the direction of the closed surface of input flange 105, toward the left in the depiction in FIG. 2. A shift in the other direction is likewise possible.

The embodiment depicted in FIG. 2 arranges openings 240 outside of area of contact 145 of bow spring 215 with input flange 105. As a result, coils of bow spring 215 do not have to run past boundaries of openings 240 during compression or decompression.

Figure 3:
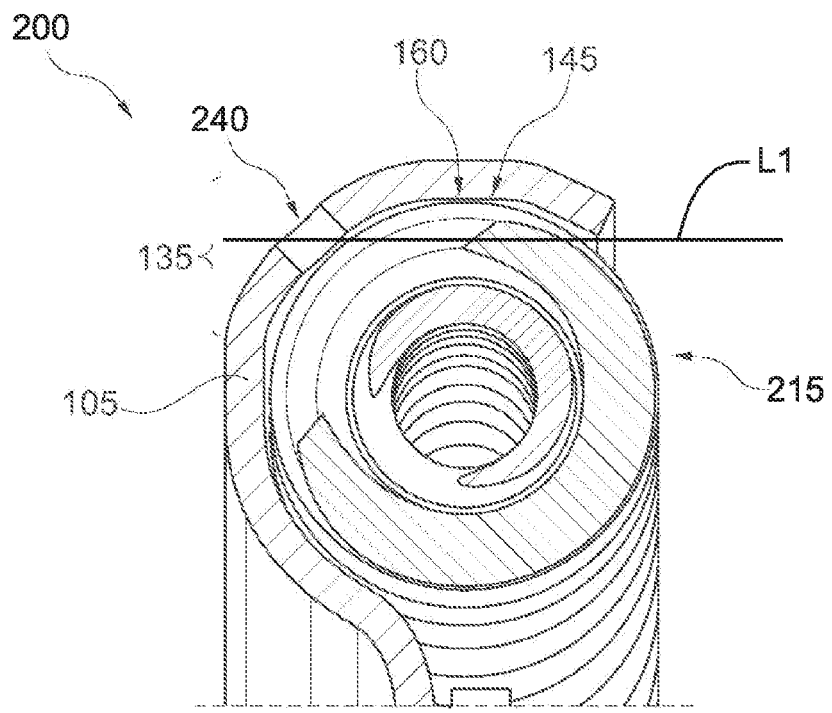
FIG. 3 shows a sectional view of the torsional vibration damper of FIG. 2.

FIG. 3 shows a sectional view of torsional vibration damper 200 of FIG. 2. The sectional plane runs through the axis of rotation of torsional vibration damper 200

Vertex 160 of input flange 105 is a point on the input flange at the greatest distance from the axis of rotation of torsional vibration damper 100. It is possible to recognize the manner in which opening 240 is displaced both radially and axially from vertex 160 of input flange 105. Opening 240 is outside of contact area 145. Line L1, parallel to axis of rotation AR, passes through opening 240 and bow spring 215.

Figure 4:
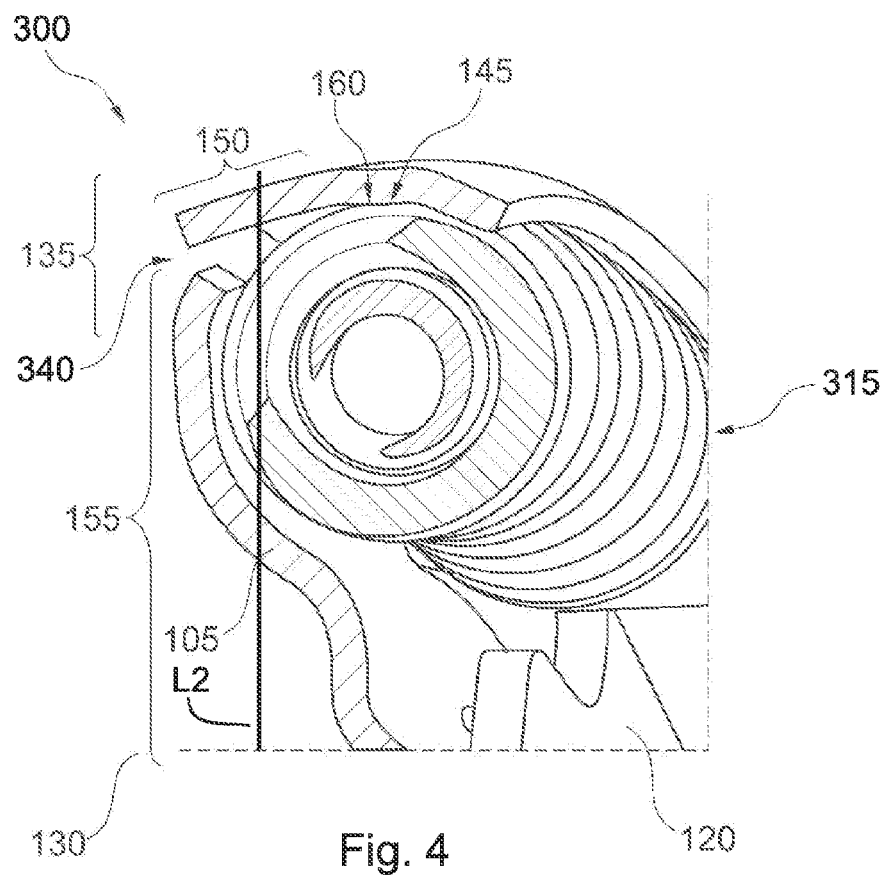
FIG. 4 shows a sectional view of a torsional vibration damper according to FIGS. 1 through 3 in yet another embodiment.

FIG. 4 shows a sectional view of torsional vibration damper 300. The sectional plane encloses an acute angle with the axis of rotation.

In the depicted embodiment, opening 340 is realized by lift flap 150 in input flange 105. Input flange 105 is made from sheet metal, for example by deep drawing or pressing.

Lift flap 150 can be produced by making a U-shaped cut or a punching in the sheet metal of input flange 105, followed by bending out the resulting tongue. The cut or punching may also be made before a metal sheet is formed into input flange 105. When the sheet metal is later shaped into input flange 105, the tongue is deformed less than a surrounding area, resulting in the depicted lift flap 150. Line L2, orthogonal to axis AR, passes through opening 340 and flap 150.

The open side of lift flap 150 points in the direction of connecting section 155 of input flange 105 that runs radially inward. Oil that collects, for example, due to splashing on the surface of connecting section 155 migrates outward on the surface of connecting section 155 as torsional vibration damper 300 rotates, due to centrifugal force. Oil flowing along on the left side of input flange 105 can pass through an opening 340 in the lift flap and flow to the area of contact 145. Due to the constant inflow of oil into contact area 145, its storage capacity is exhausted at some time, so that part of the stored oil is removed again from contact area 145 through one of openings 340 or in the area of the upper right boundary of input flange 105 in FIG. 4. The abrasion particles from bow spring 315 or from input flange 105 can be removed in this way from contact area 145 by means of the oil, so that the formation of a polishing layer or grinding paste based on the abrasion particles is prevented.

Figure 5:
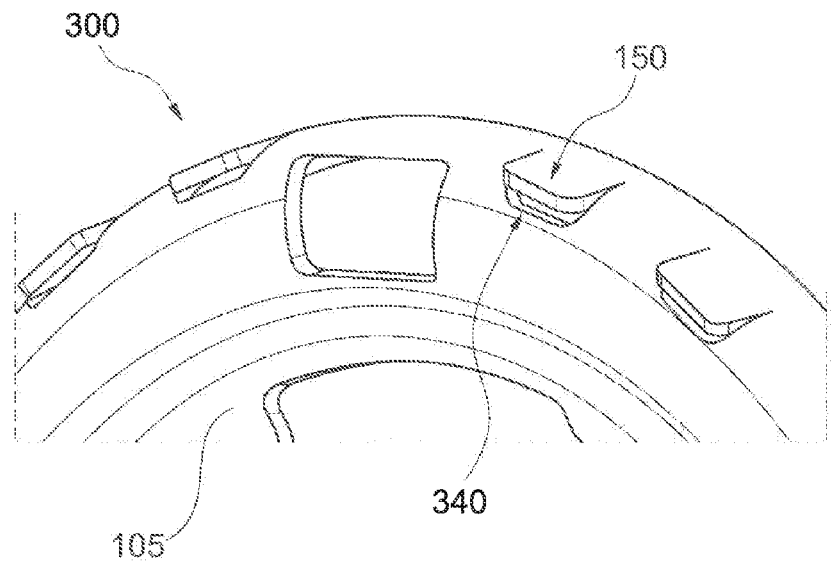
FIG. 5 shows another view of the torsional vibration damper from FIG. 4.

FIG. 5 shows another view of torsional vibration damper 300 from FIG. 4. For better understanding, only input flange 105 is shown, without bow springs 315 and output flange 110. At lift flaps 150 which form the openings 340, the U-shaped separating lines, cuts or stampings in the material of input flange 105 are clearly recognizable.

Figure 6:
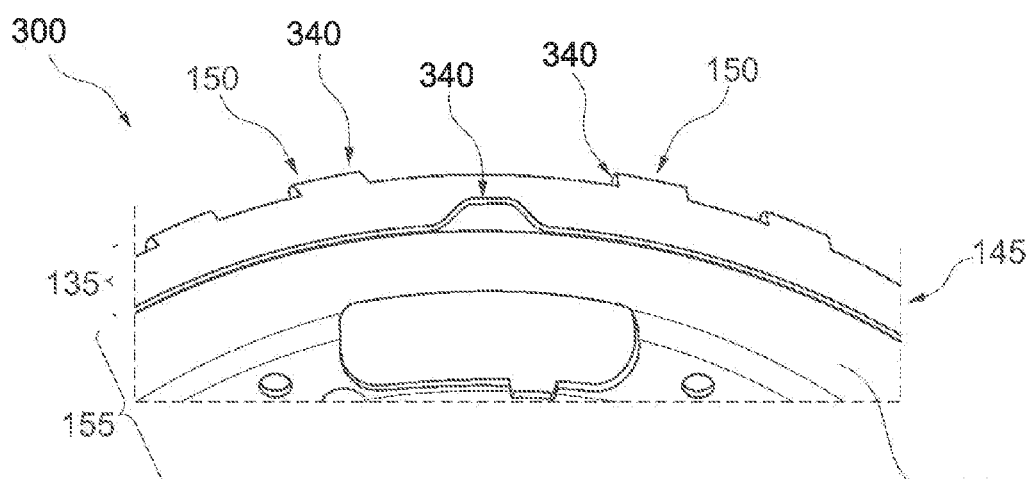
FIG. 6 shows the input flange from FIG. 5 in a different perspective.

FIG. 6 shows input flange 105 from FIG. 5 in a different perspective. In addition to openings 340 formed by lift flaps 150, an additional opening 340 is made in holding device 135 of input flange 105. The additional opening 340 is located opposite lift flaps 150 relative to the vertex, so that it is not made in the area of connecting section 155, but rather in the area of the edge of input flange 105 shown at the upper right in FIG. 4.

The additional opening 340 enables an improved flow of oil out of holding device 135, while lift flaps 150 transport oil in an improved manner into holding device 135 or contact area 145.

LIST OF REFERENCE NUMBERS 100 torsional vibration damper
200 torsional vibration damper
300 torsional vibration damper
105 input flange
110 output flange
115 bow spring
215 bow spring
315 bow spring
120 first contact element
125 second contact element
130 internal clutch basket
135 holding device
140 opening
240 opening
340 opening
145 contact area
150 lift flap
155 connecting section
160 vertex
AR axis of rotation
L1 line parallel to axis of rotation
L2 line orthogonal to axis of rotation

What is claimed is:

1. A torsional vibration damper for operation in an oil bath, the torsional vibration damper comprising:
an axis of rotation;
an input flange for connecting to a drive motor and including a radially outermost circumference;
an output flange for connecting to a transmission; and,
a bow spring for the rotationally elastic connection of the input flange to the output flange, wherein:
a radially outer portion of the input flange partially encircles the bow spring;
an annular portion of the radially outer portion includes the radially outermost circumference;
the annular portion is continuous in a circumferential direction;
a radially outermost portion of the bow spring can be in contact with the radially outer portion of the input flange;
an opening passes through an area of the radially outer portion of the input flange offset from the annular portion in a direction parallel to the axis of rotation;
a line oriented in the direction passes through the opening and the bow spring; and,
the opening is to enable a flow of oil through an area of contact of the bow spring with the radially outer potion holding device.

2. The torsional vibration damper as recited in claim 1, wherein the opening is situated in the area of a radial vertex of the holding device.

3. The torsional vibration device as recited in claim 1, wherein the opening is located outside of the contact area.

4. The torsional vibration damper as recited in claim 1, wherein the output flange includes a lift flap forming a portion of the opening.

5. The torsional vibration damper as recited in claim 4, wherein a line orthogonal to the axis of rotation passes through the opening and the lift flap.

6. A torsional vibration damper for operation in an oil bath, the torsional vibration damper comprising:
an axis of rotation;
an input flange for connecting to a drive motor and including an opening;
an output flange for connecting to a transmission; and,
a bow spring engaged with the input and output flanges, wherein:
a first portion of the input flange partially encircles the bow spring;
a radially outermost portion of the bow spring is in contact with an area of the first portion of the input flange;
the area of the first portion of the input flange is continuous in a circumferential direction; and,
the opening is located:
within the first portion of the input flange; and,
outside of the area of the first portion of the input flange.

7. A torsional vibration damper for operation in an oil bath, the torsional vibration damper comprising:
an axis of rotation;
an input flange for connecting to a drive motor and including first and second openings;
an output flange for connecting to a transmission; and,
a bow spring engaged with the input and output flanges, wherein:
a first portion of the input flange partially encircles the bow spring;
a radially outermost portion of the bow spring is in contact with an area of the first portion;
the area of the first portion of the input flange is continuous in a circumferential direction;
the first opening is located:
in the first portion of the input flange; and, offset from the area of the first portion of the input flange in a first axial direction parallel to the axis of rotation; and, the second opening is located:
  in the first portion of the input flange; and,
  offset from the area of the first portion of the input flange in a second axial direction, opposite the first axial direction.

* * * * *